June 6, 1933.  C. SAUZEDDE  1,912,594
METHOD OF MAKING RIMS
Filed July 20, 1929
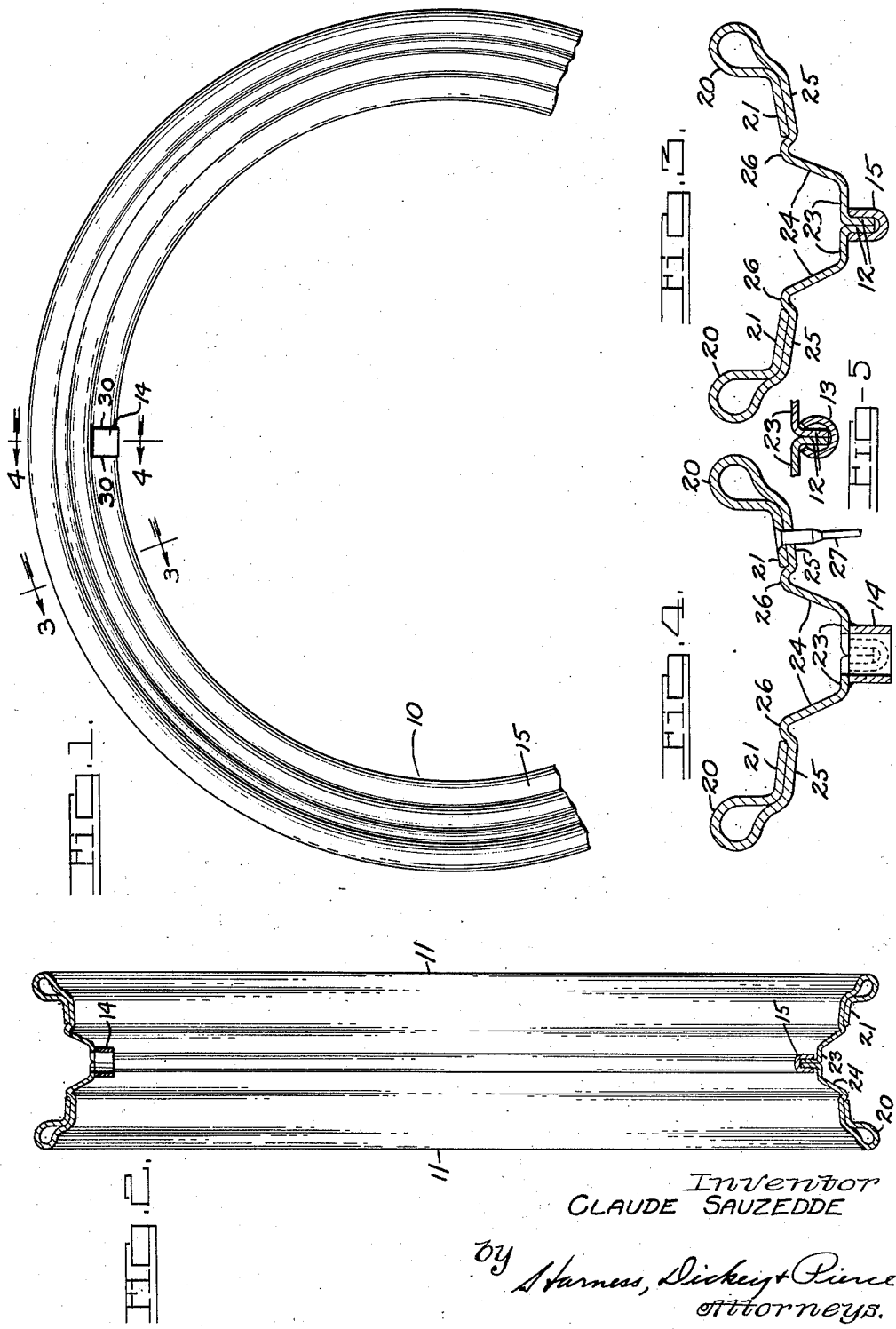
Inventor
CLAUDE SAUZEDDE
by Harness, Dickey & Pierce
Attorneys.

Patented June 6, 1933

1,912,594

UNITED STATES PATENT OFFICE

CLAUDE SAUZEDDE, OF DETROIT, MICHIGAN, ASSIGNOR TO DETROIT HYDROSTATIC BRAKE CORPORATION, A CORPORATION OF MICHIGAN

METHOD OF MAKING RIMS

Application filed July 20, 1929. Serial No. 379,669.

The present invention relates to tire rims, and particularly those adapted for use in connection with automobiles and aeroplanes, the principal object being the provision of a rim that is easily and cheaply constructed.

Another object is to provide a rim that is very light in weight and yet so constructed as to be much stronger than the conventional types of rims of equal weight.

Another object is the provision of a rim particularly adapted for use in connection with wire wheels.

Another object of this invention is the provision of a simple means for integrally uniting two separately formed rim parts.

The above being among the objects of the present invention, the same consists in certain novel features of construction and combinations of parts to be hereinafter described with reference to the accompanying drawing and then claimed, having the above and other objects in view.

In the accompanying drawing which shows a suitable embodiment of the present invention, and in which like numerals refer to like parts throughout the several different views;

Fig. 1 is a fragmentary side elevation of a rim.

Fig. 2 is an enlarged diametrical sectional view of Fig. 1 taken through the valve stem opening.

Fig. 3 is an enlarged sectional view taken on the line 3—3 of Fig. 1.

Fig. 4 is an enlarged sectional view taken on the line 4—4 of Fig. 1.

Fig. 5 is a fragmentary sectional view showing the split tube employed for holding the rim halves together preparatory to pressing the same to its final form.

The invention herein described and claimed is an improvement over my application for Letters Patent of the United States for improvements in Wheel rims, filed April 8, 1929, Serial No. 353,373. In this invention I have provided a rim that is perhaps easier to construct and cheaper to manufacture than that disclosed in the above identified application. It is formed so as to have a maximum of strength and durability.

In rims, particularly those used on wheels for aeroplanes and automobiles, it is desired to obtain a rim that will stand the maximum impact stresses and yet be very light in weight. Although steel or any other suitable metal may be employed in making this rim, I prefer to employ a heat treated aluminum alloy such as duralumin, as I have thus been able to reduce the weight of the rim to about two-thirds of that of the conventional steel rims. Along with this desirable feature, I have provided a construction which gives the maximum strength obtainable in a rim and is exceedingly simple and economical to manufacture.

As illustrative of the present invention, I have shown in the drawing a drop center rim 10 comprising two identically opposite circular sections 11 each having an inwardly extending flange 12. In the broader aspect of the present invention any suitable or conventional means may be provided for rigidly securing these flanges together, when disposed in concentric and contacting relationship, to form the rim as a whole into an integral structure. Such conventional means may take the form of rivets, welding, or rolling one flange over the other, as will be obvious to those skilled in the art. However, in accordance with a further object of the present invention, I provide a novel and unconventional manner of securing the flanges 12 together by a ring member 13 compressed about them and serving to hold them against both relative axial and radial displacement with respect to each other.

Each circular section 11 is formed in the following manner: From a disc ring including the flange 12 a short outwardly extending portion 23 is provided from whose outer edge the angularly outward portion 24 extends, these two portions cooperating with the same portions on the other circular section in the completed rim to form the drop center portion of the rim. From the outer edge of the inclined or offsetting portion 24 the metal of the section is bent outwardly as at 25 approximately perpendicular to the plane of the ring or its flange 12, to provide a base for a tire seat and also bead 20, which is formed by bending the metal of the section outwardly and back on itself, to provide both a tubular bead adjacent base 25, and the metal may be extended inwardly to provide a flange as at 21, in contact with the outer face of the base portion 25. The inwardly extending flange portions 21 cooperate with each other and with said base portions in the assembled rim, to provide laterally offset and substantially cylindrical tire seats of double thickness, and the beads 20 cooperate to confine the tire against lateral spreading. At the point of connection between the portions 24 and 25 I prefer to form a radially outwardly extending bead 26 serving as a shoulder against which the inner edge of the portion 21 is adapted to abut and thus prevent inward movement of the portion 21 on the portion 25. A tendency towards such movement would arise upon radial impact on the bead 20, as will be apparent, and resistance towards such tendency materially increases the strength of the structure. This resistance is further increased when the rim is used for wire wheels, as in such case the spokes 27 are preferably anchored in the double thickness tire seats 21—25 and, in passing through the seats said spokes act, in the form shown, to lock the portions 21—25 against relative movement. In order to receive the spokes 27 the portions 21—25 may be either drilled and counter sunk, as shown, or may be punched with a cup for the spoke head in the manner described in my previous application referred to.

In the operation of securing the rim halves together to form an integral structure, the flanges 12 are placed in contact with each other and axially aligned. The tubular casing 14 may be adapted to fit in notches in the flanges 12 provided to receive it and to contact with the portions 23. The circumferentially slotted and outwardly concave split ring 13 may be circular in section and sprung over the flanges 12 as shown in Fig. 5. With one end abutting against the casing 14, the split ring 13 may be axially flattened upon the flanges 12 until its opposite end abuts against the opposite side of the casing 14. The flanges 12 are preferably so proportioned as to be fully received within the ring 13 when the latter is deformed, as by means of a press or other suitable means whereby the sides of the split ring 13 are pressed together axially into the form shown at 15; and the edges of the ring 13 are incidentally expanded or pressed radially outwardly against the cylindrical portions 23, when these are provided, until the sides of the ring clamp the flanges 12 together,—thus securing the rim halves against movement with respect to each other both radially and axially. It will be apparent that the other methods of securing the flanges 12 together may be used. The casing 14 is held between the abutted ends of the spring ring 13 and is preferably welded to them as at 30, thereby making a more secure joint and preventing possible displacement of the ring.

It will be observed from the above description that the split ring 13 after being pressed together increases the radial dimension of the rim section, acting as a stiffener for the rim, and therefore increases the strength of the ring considerably. It will be understood that this construction is not limited to drop center rims alone.

It will be apparent from the above description that this rim is one continuous circle and has no riveted joints. These features make this rim one easy to manufacture and one which has maximum strength with the lightest weight. Another feature is that both rim halves may be made from the same dies, thereby decreasing the manufacturing cost considerably.

Formal changes may be made in the specific embodiment of the invention described without departing from the spirit or substance of the broad invention, the scope of which is commensurate with the appended claims.

What I claim is:

1. The method of forming a rim comprising: forming two complementary rings, one edge of each of which is provided with an outwardly extending peripheral bead and the other edge of which is provided with a radially inwardly extending flange, and securing said flanges together by flattening thereon a longitudinally split tube-like clamping ring member.

2. The method of forming a rim comprising: forming two complementary rings, one edge of each of which is provided with an outwardly extending peripheral bead and the other edge of which is provided with a radially inwardly extending flange, and securing said flanges together by flattening thereon a longitudinally split tube-like clamping ring member enclosing both of said flanges.

3. The method of forming a rim comprising: forming two complementary rings one edge of each of which is provided with an outwardly extending peripheral bead and the other edge of which is provided with a radially inwardly extending flange, placing said flanges together, enclosing said flanges in a longitudinally split tube-like sheet metal ring and so deforming said last-mentioned ring as radially to expand the same relatively to said flanges.

4. The method of making a rim consisting in forming two identical rings from sheet metal, bending one edge of each of said rings back upon itself, flanging the opposite edge of each of said rings inwardly into parallel relation with the plane of the ring, and then securing the flanges together by flattening and radially expanding a longitudinally split clamping ring thereupon.

5. The method of making a wheel rim consisting in forming two identical circular rings by bending one edge of each of said rings into a tubular shape and back upon itself to form a base of double thickness while leaving the other edge of each of said rings in parallel relation with the plane of said ring and substantially perpendicular to said base; and securing said flanged portions together by flattening and radially expanding a longitudinally split clamping ring thereupon.

6. A rim structure composed of two symmetrical peripherally divided sections, the sections having inwardly directed flanges about their inner peripheries, a valve securing tubular portion formed upon the rim section adjacent to the flanges, a transplit channel like ring clamping the flanges together, the ends thereof engaging the valve receiving portion.

7. The method of forming a rim comprising: forming two complementary and substantially identical rings, one edge of each of which is provided with an outwardly extending peripheral bead and the other edge of which is provided with a radially inwardly extending flange, applying an outwardly concave tube-like ring to said flange, and securing said flanges together by flattening said ring thereon by axial pressure tending to radially expand the same.

CLAUDE SAUZEDDE.